(No Model.)

C. D. SALFIELD.
CULINARY BOILER.

No. 373,310. Patented Nov. 15, 1887.

Witnesses,
Geo. H. Strong.

Inventor,
C. D. Salfield
By Dewey & Co.
attys

UNITED STATES PATENT OFFICE.

CARL D. SALFIELD, OF SAN FRANCISCO, CALIFORNIA.

CULINARY BOILER.

SPECIFICATION forming part of Letters Patent No. 373,310, dated November 15, 1887.

Application filed May 11, 1887. Serial No. 237,900. (No model.)

*To all whom it may concern:*

Be it known that I, CARL D. SALFIELD, of the city and county of San Francisco, State of California, have invented an Improvement in Culinary Boilers; and I hereby declare the following to be a full, clear, and exact description of the same.

My invention relates to a culinary boiler or vessel for cooking various articles; and it consists of a main boiler having a supplemental extension at one side with an opening between the two, in combination with a cover having a deep vertical flange, one portion of which is cut away so as to correspond with the opening, while another portion is provided with a strainer to correspond with the same opening, the remainder of the rim or flange forming a stop which will entirely close the opening when so desired.

Figure 1:
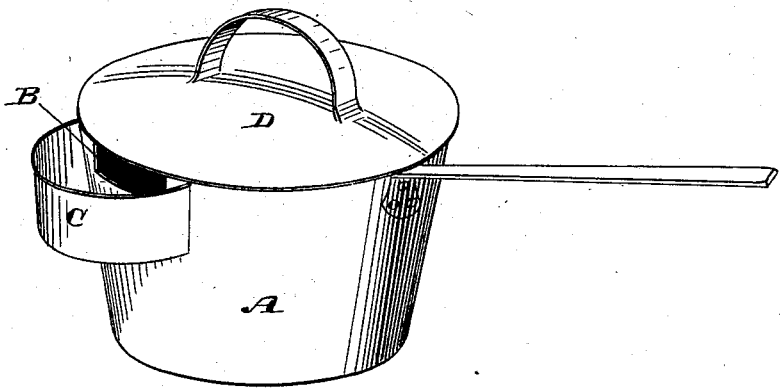
Figure 2:
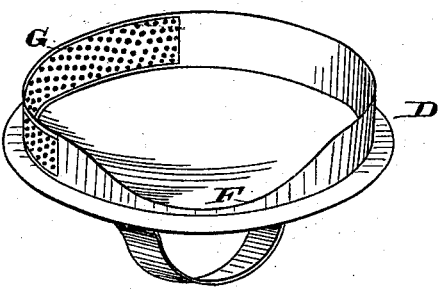

Referring to the accompanying drawings for a more complete explanation of my invention, Figure 1 is a perspective view of the device. Fig. 2 is a perspective view of the cover and flange.

A is the main vessel or boiler, which may be made of tin or other metal or material, and it has upon one side near the top an opening, B, of considerable size. Corresponding with this opening is the supplemental chamber C, which is secured permanently to the side of the main vessel, so as to inclose the opening B. The bottom of this second supplemental chamber is considerably above the level of the bottom of the main vessel, so that it will not come in contact with the stove and will not be unduly heated therefrom.

D is the cover, which fits the main vessel and has a deep vertical flange which projects downward inside the rim of the main vessel. This flange is of such depth that it will entirely cover and close the opening B, which leads from the main vessel into the supplemental chamber. Upon one side this flange is cut away, as shown at F, so as to leave a space or opening which will correspond with the opening B when the cover is put on so that this space is opposite the opening B. Upon another portion of this flange is fitted a screen material, G, the size of which is equal to that of the opening B, and the cover may be turned around so that this screen will stand opposite the opening B for certain purposes.

The operation will then be as follows: When it is desired to cook anything within the boiler or vessel where it is necessary to keep the vessel closed and prevent as much as possible the escape of steam, the cover is put on in such a manner that the closed portion of the flange will stand opposite the opening B, and this will prevent, to a great extent, the escape of steam from the vessel. If it is desired to turn the water out of the vessel without allowing the contents to escape, the cover is simply turned around until the perforated or screen portion stands opposite the opening B, when the water or liquid may be decanted or poured off, passing through the screen-opening and the supplemental chamber, while the contents of the main vessel will be prevented from escaping. When it is desired to boil milk or other substance which is liable to thicken and overflow, the cover is turned to such a point that the cut-away portion will stand opposite the opening B, thus leaving a free escape for the cream or other overflowing substance into the supplemental chamber, which thus receives it and prevents its boiling over upon the stove, as shown in a former application made by me.

My present device proves a very convenient vessel for all culinary purposes, by reason of the flange or cover with its various openings and screens.

I do not claim in this application the boiler having the supplemental chamber secured permanently to its side, said chamber communicating with the boiler through an opening in the upper portion of the latter, as such a construction forms the subject-matter of another application filed by me April 16, 1887, Serial No. 235,054.

Having thus described my invention, what I claim as new, and desire to secure by Letters Patent, is—

A culinary vessel consisting of the main and supplemental chambers united together, as shown, and having the opening near the top forming communication between them, in combination with a cover having a vertical flange the lower edge of which extends below the bottom of the opening, said flange having one portion cut away to correspond with the opening and another portion provided with a screen or perforations, substantially as herein described.

In witness whereof I have hereunto set my hand.

CARL D. SALFIELD.

Witnesses:
S. H. NOURSE,
W. H. PATTERSON.